United States Patent [19]

Brundage et al.

[11] 3,928,366

[45] Dec. 23, 1975

[54] PREPARATION OF 2-SUBSTITUTED-6-PYRIDYL-NICOTINIC ACIDS

[75] Inventors: Ruth Pauline Brundage; George Y. Lesher, both of Schodack, N.Y.

[73] Assignee: Sterling Drug Inc., New York, N.Y.

[22] Filed: Mar. 20, 1974

[21] Appl. No.: 452,806

Related U.S. Application Data

[62] Division of Ser. No. 346,190, March 29, 1973, Pat. No. 3,838,156.

[52] U.S. Cl. .................................... 260/295.5 R
[51] Int. Cl.$^2$ .................................... C07D 213/22
[58] Field of Search ...................... 260/295.5 R

[56] References Cited
OTHER PUBLICATIONS

Klingsber, "Pyridine and Derivatives," Part 3, (1962), pp. 197, 245.
Bergstrom, "Chem. Reviews," Vol. 35, No. 2, (1944), pp. 137.

*Primary Examiner*—Henry R. Jiles
*Assistant Examiner*—Robert W. Ramsuer
*Attorney, Agent, or Firm*—Robert K. Bair; B. Woodrow Wyatt

[57] ABSTRACT

Intermediate 2-$R_1$NH-6-Q'''-nicotinic acid (V'), where $R_1$ is lower-alkyl and Q''' is 4(or 3)-pyridyl or 4(or 3)-pyridyl having one or two lower-alkyl substituents, is prepared in the three steps of: hydrolyzing 1,2-dihydro-2-oxo-6-Q'''-nicotinonitrile (VII) to produce 1,2-dihydro-2-oxo-6-Q'''-nicotinic acid (VIII); halogenating VIII to produce 2-halo-6-Q'''-nicotinic acid (VI'); and, reacting VI' with $R_1NH_2$ to produce V'. Also shown are the steps of: reacting 2-halo-6-Q''-nicotinic acid (VI), where Q'' is as Q''' and also lower-alkyl, to produce 2-$R_1$NH-6-Q''-nicotinic acid (V); heating V with a lower-alkyl chloroformate or phosgene to produce 1-$R_1$-7-Q''-1H,4H-pyrido[2,3-d][1,3]oxazine-2,4-dione (I'); converting I' where Q'' is $CH_3$ to its 8-oxide and reacting the 8-oxide with a lower-alkanoic acid anhydride to produce I where 7-$CH_3$ is converted to 7-(lower-alkanoyloxymethyl); reacting 1-$R_1$-7-Q-1H,4H-pyrido[2,3-d][1,3]oxazine-2,4-dione, where Q is as Q'' and also lower-alkanoyloxymethyl, with $R_2$-C(=O)$CH_2$COOR, where $R_2$ is H or $CH_3$ and R is lower-alkyl, to produce lower-alkyl 1-$R_1$-1,4-dihydro-2-$R_2$-4-oxo-7-Q-1,8-naphthyridine-3-carboxylate (III); and, hydrolyzing III to obtain 1-$R_1$-1,4-dihydro-2-$R_2$-4-oxo-7-Q'-1,8-naphthyridine-3-carboxylic acid (IV), where Q' is like Q but having hydroxymethyl in place of lower-alkanoyloxymethyl.

1 Claim, No Drawings

PREPARATION OF 2-SUBSTITUTED-6-PYRIDYL-NICOTINIC ACIDS

This application is a division of copending application Ser. No. 346,190, filed Mar. 29, 1973, and now U.S. Pat. No. 3,838,156, issued Sept. 24, 1974.

This invention relates to nicotinic acid derivatives and to their preparation.

The compounds of the instant invention are useful in the preparation of anitbacterial agents as disclosed in the copending Zalay and Bell application Ser. No. 346,191, filed Mar. 29, 1973 and now U.S. Pat. 3,838,120, issued Sept. 24, 1974. Said copending application discloses and claims a novel process which comprises reacting 1-$R_1$-7-Q-1H,4H-pyrido[2,3-d][1,3]oxazine-2,4-dione of formula I

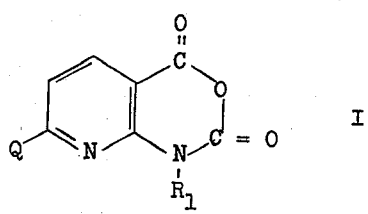

with a compound of formula II

where Q is lower-alkyl, lower-alkanoyloxymethyl, 4(or 3)-pyridyl or 4(or 3)-pyridyl having one or two lower-alkyl substituents, $R_1$ and R are each lower-alkyl and $R_2$ is H or $CH_3$, to produce lower-alkyl 1-$R_1$-1,4-dihydro-2-$R_2$-4-oxo-7-Q-1,8-naphthyridine-3-carboxylate of formula III

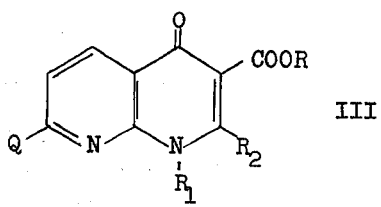

where Q, R, $R_1$ and $R_2$ are defined as above for formulas I and II, and hydrolyzing III to obtain the corresponding 3-carboxylic acid of formula IV

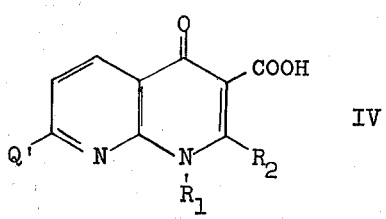

where Q' is lower-alkyl, hydroxymethyl, 4(or 3)-pyridyl or 4(or 3)-pyridyl having one or two lower-alkyl substituents, $R_1$ is lower-alkyl and $R_2$ is H or $CH_3$. The compounds of formula IV are disclosed and claimed in U.S. Pat. No. 3,590,036, issued June 29, 1971. Perhaps best known because of their high antibacterial activity are nalidixic acid (IV where Q' is $CH_3$, $R_1$ is $C_2H_5$ and $R_2$ is H) and hydroxynalidixic acid (IV where Q' is $HOCH_2$, $R_1$ is $C_2H_5$ and $R_2$ is H).

Other aspects of the invention disclosed and claimed in copending application Ser. No. 346,191, now U.S. Pat. No. 3,838,120, issued Sept. 24, 1974, reside in the intermediate 1-(lower-alkyl)-7-Q-1H,4H-pyrido-[2,3-d][1,3]oxazine-2,4-dione of formula I; in the process for its preparation where Q is Q'' or as defined for formula I but excluding lower-alkanoyloxymethyl which comprises heating 2-$R_1$NH-6-Q''-nicotinic acid of formula V

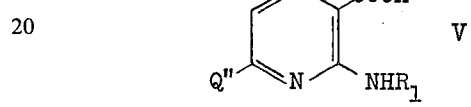

with a lower-alkyl chloroformate or phosgene, where $R_1$ is defined as in formula I and Q'' is lower-alkyl, 4(or 3)-pyridyl or 4(or 3)-pyridyl having one or two lower-alkyl substituents, which, in turn, are prepared by reacting the corresponding 2-halo-6-Q''-nicotinic acid (VI) with a lower-akylamine of the formula $R_1NH_2$; and in the process for the preparation of I where Q is lower-alkanoyloxymethyl which comprises reacting 1-$R_1$-7-methyl-1H,4H-pyrido[2,3-d][1,3]oxazine-2,3-dione (I where Q is methyl) with an oxidizing agent capable of converting pyridines to pyridine-N-oxides to produce 1-$R_1$-7-methyl-1H,4H-pyrido[2,3-d][1,3]oxazine-2,4-dione-8-oxide and then reacting said 8-oxide with a lower-alkanoic acid anhydride to produce I where Q is lower-alkanoyloxymethyl.

Aspects of the instant invention reside in the intermediate 2-$R_1$NH-6-Q'''-nicotinic acid of formula V'

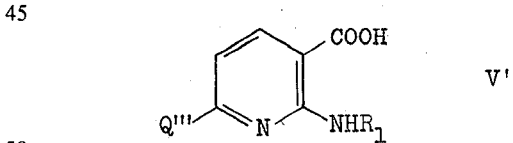

where $R_1$ is lower-alkyl and Q''' is 4(or 3)-pyridyl or 4(or 3)-pyridyl having one or two lower-alkyl substituents, and in the process of its preparation which comprises the combination of the three steps of hydrolyzing 1,2-dihydro-2-oxo-6-Q'''-nicotinonitrile (VII) to produce 1,2-dihydro-2-oxo-6-Q'''-nicotinic acid (VIII), halogenating VIII to produce 2-halo-6-Q'''-nicotinic acid (VI') and reacting VI' with a lower-alkylamine of the formula $R_1NH_2$ to produce V'. In addition to said combination of the three steps, other process aspects of the invention are each individual step and the two combinations of two consecutive steps.

Additional composition aspects of the instant invention reside in the compounds: 1,2-dihydro-2-oxo-6-Q'''-nicotinic acid and its tautomeric 2-hydroxy-6-Q''λ'-nicotinic acid of the respective formulas VIII and VIIIA

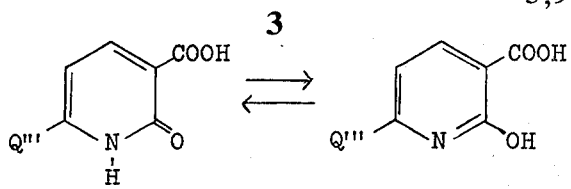

VIII          VIIIA and, also, 2-halo-6-Q'''-nicotinic acid of the formula VI'

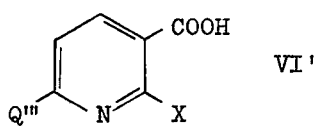

VI' where Q''' has the meaning designated hereinabove for formula V' and X is halo, preferably chloro or bromo.

Because of the ready availability and/or low cost of intermediates and/or because of high antibacterial activity of the final products (III or IV), preferred process and composition embodiments of the various aspects of the inventions herein disclosed are those where $R_1$ is ethyl, $R_2$ is hydrogen, halo is chloro, Q is methyl, acetoxymethyl, 4(or 3)-pyridyl, 2-methyl-4-pyridyl or 2,6-dimethyl-4-pyridyl, Q' is as Q and also hydroxymethyl, Q'' is as Q but excluding acetoxymethyl, and Q''' is 4(or 3)-pyridyl, 2-methyl-4-pyridyl or 2,6-dimethyl-4-pyridyl.

The term "lower-alkyl", as used herein, e.g., as represented by $R_1$ in formula I, III or IV or as a substituent of 4(or 3)-pyridyl when represented by Q in formulas I or III or by Q' in formula IV, means alkyl radicals having from 1 to 6 carbon atoms which can be arranged as straight or branched chains, illustrated by methyl, ethyl, n-propyl, isopropyl, n-butyl, sec-butyl, isobutyl, n-amyl, n-hexyl, and the like.

The term "lower-alkanoyl", as used herein, e.g., in the definition of the Q substituent as lower-alkanoyloxymethyl in formulas I or III, means alkanoyl radicals having from one to six carbon atoms, including the straight- and branched-chain radicals, illustrated by formyl, acetyl, propionyl (propanoyl), butyryl (butanoyl), isobutyryl (2-methylpropanoyl) and caproyl (hexanoyl).

Illustrative of the Q substituent in formulas I or III or of the Q' substituent in formula IV or of the Q'' substituent in formula V or of the Q''' substituent in formulas V', VI', VII, VIII or VIIIA where Q or Q' or Q'' or Q''', respectively, is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2-isopropyl-4-pyridyl, 2-n-butyl-4-pyridyl, 2-n-hexyl-4-pyridyl, 2,6-diethyl-4-pyridyl, 2,6-diethyl-3-pyridyl, 2,6-diisopropyl-4-pyridyl, 2,6-di-n-hexyl-4-pyridyl, and the like.

As shown above, 1,2-dihydro-2-oxo-6-Q'''-nicotinic acid of formula VIII is tautomeric with 2-hydroxy-6-Q'''-nicotinic acid of formula VIIIA. As with all tautomeric systems, the rate of the transformation VIII VIIIA and the ratio VIII/VIIIA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as VIII and the names of the compounds herein therefore are preferably based on structure VIII, although it is understood that either or both structures are comprehended.

The intermediate 2-(lower-alkylamino)-6-(lower-alkyl)-nicotinic acid (V where Q'' is lower-alkyl) is prepared by halogenating the generally known 1,2-dihydro-2-oxo-6-(lower-alkyl)nicotinic acid with a halogenating agent, preferably a chlorinating agent, e.g., $PCl_3$, $PCl_5$, $POCl_3$, $SO_2Cl_2$, and the like, to produce 2-halo-6-(lower-alkyl)-nicotinic acid and then reacting said 2-halo acid with a lower-alkylamine ($R_1NH_2$).

The generally known intermediate 1,2-dihydro-2-oxo-6-Q'''-nicotinonitrile (VII) or tautomer (VIIA) is prepared by the known procedure of first reacting 4(or 3)-acetylpyridine or 4(or 3)-acetylpyridine substituted on the pyridine ring by one or two lower-alkyl substituents, as represented by Q'''-$COCH_3$, with ethyl formate and sodium methoxide to yield the sodium salt of Q'''-$COCH_2CHO$, e.g., the sodium salt of isonicotinoylacetaldehyde where Q''' is 4-pyridyl, and then reacting said sodium salt with cyanoacetamide in aqueous medium to produce said 1,2-dihydro-2-oxo-6-Q'''-nicotinonitrile, e.g., where Q''' is 4-pyridyl, also named 1,6-dihydro-6-oxo[2,4'-bipyridine]-5-carbonitrile.

The molecular structures of said intermediate aspects (I, V', VI', VIII and VIIIA) of the inventions herein disclosed and of the final products (III and IV) are assigned on the basis of evidence provided by infrared, ultraviolet and nuclear magnetic resonance spectra, and by the correspondence of calculated and found values for the elementary analysis for representative examples.

The manner of making and using the instant invention will now be generally described so as to enable a person skilled in the art of pharmaceutical chemistry to make and use the same, as follows:

The hydrolysis of 1,2-dihydro-2-oxo-6-Q'''-nicotinonitrile (VII) or its tautomer (VIIA) to produce the corresponding 1,2-dihydro-2-oxo-6-Q'''-nicotinic acid is preferably carried out by refluxing VII (or VIIA) in an aqueous acidic medium, preferably using from about 1:2 to 1:1 parts by volume of concentrated (95–97%) sulfuric acid and water, respectively. Other aqueous acidic media can be used, e.g., 6N hydrochloric acid, and the like.

The reaction of 1,2-dihydro-2-oxo-6-(lower-alkyl)-nicotinic acid (VIII) or 2-hydroxy-6-Q'''-nicotinic acid (VIIIA) with a halogenating agent, preferably a mixture of phosphorus oxychloride and phosphorus pentachloride, is carried out by heating the reactants, preferably at about 50°–110°C. The reaction is conveniently run by refluxing the reactants in chloroform; however, the reaction can be run in the absence of a solvent or using another inert solvent, e.g., benzene, toluene, xylene, chlorobenzene, methylene dichloride, and the like. Also, other chlorinating agents can be used, e.g., phosphorus oxychloride or phosphorus pentachloride alone, phosphorus trichloride, thionyl chloride, phosgene, phenylphosphonic dichloride, and the like.

The reaction of 2-halo-6-Q''(or Q''')-nicotinic acid (VI or VI') with a lower-alkylamine, $R_1$-$NH_2$, to produce 2-$R_1NH$-6-Q''(or Q''')-nicotinic acid (V or V') is conveniently carried out by heating the reactants together in a stainless steel autoclave. The reaction temperature is about 75°–150°C., preferably about 90°–110°C. Alternatively, a suitable inert solvent can be used, e.g., ethanol, toluene, xylene, benzene, and the like.

The reaction of 2-$R_1NH$-6-Q''-nicotinic acid (V) with a lower-alkyl chloroformate to produce 1-$R_1$-7-Q''-1H,4H-pyrido[2,3-d][1,3]oxazine-2,4-dione is carried out by heating the reactants at about 125°–175°C., preferably about 135°–150°C. in the absence or presence of an inert solvent, e.g., xylene. Alternatively, phosgene can be used in place of the lower-alkyl chloroformate.

The reaction of 1-$R_1$-7-methyl-1H,4H-pyrido[2,3-d]-[1,3]oxazine-2,3-dione (I where Q is methyl) with an oxidizing agent to produce 1-$R_1$-7-methyl-1H,4H-pyrido[2,3-d][1,3]oxazine-2,4-dione-8-oxide is carried out by reacting I where Q is methyl with an oxidizing agent capable of converting pyridines to pyridine-N-oxides, preferably with a per acid, e.g., peracetic acid, perbenzoic acid, 3-chloroperbenzoic acid, and the like, or with other oxidizing agents, e.g., hydrogen peroxide, in the presence of a suitable solvent inert under the reaction conditions, e.g., acetic acid, chloroform, and the like. The reaction is conveniently run by mixing the reactants carefully at room temperature (about 20°–25°C.) up to about 40°–50°C., preferably with stirring, and then heating the reaction mixture on a steam bath to ensure completion of the reaction.

The conversion of 1-$R_1$-7-methyl-1H,4H-pyrido[2,3-]-[1,3]oxazine-2,3-dione-8-oxide to 1-$R_1$-7-(lower-alkanoyloxymethyl)-1H,4H-pyrido[2,3-d][1,3]oxazine-2,3-dione is carried out by reacting said 8-oxide with a lower-alkanoic acid anhydride. The reaction is conveniently run using as solvent an excess of the anhydride or the corresponding alkanoic acid, e.g., acetic acid with acetic anhydride, or any suitable solvent unreactive to said anhydrides, e.g., acetonitrile, benzene, toluene, dimethylformamide, and the like. The reaction is generally carried out in the range of about 70°–150°C., preferably on a steam bath.

The reaction of 1-$R_1$-7-Q-1H,4H-pyrido[2,3-d][1,3]-oxazine-2,4-dione (I) with a lower-alkyl acetoacetate (II, $R_2$=$CH_3$) or formylacetate (II, $R_2$=H), the latter preferably as its alkali metal enolate, to produce a lower-alkyl 1-$R_1$-1,4-dihydro-4-oxo-2-$R_2$-7-Q-1,8-naphthyridine-3-carboxylate (III) is carried out by heating the reactants in the range of about 50°–150°C., preferably about 80°–120°C., preferably using an inert solvent, e.g., dimethylformamide. Alternatively, the lower-alkyl formylacetate can be prepared in situ from a lower-alkyl ether or lower-alkanoate (1–6 carbon atoms) of its enol form, preferably its methyl or ethyl ether or its acetate.

The hydrolysis of lower-alkyl 1-$R_1$-1,4-dihydro-4-oxo-2-$R_2$-7-Q-1,8-naphthyridine-3-carboxylate (III) to produce 1-$R_1$-1,4-dihydro-4-oxo-2-$R_2$-7-Q'-1,8-naphthyridine-3-carboxylic acid (IV) is run either under acidic or alkaline conditions. The hydrolysis can be carried out from about room temperature (25°C.) to about 100°C. using, where necessary, an appropriate solvent, e.g., water, ethanol, methanol, acetone, and the like. Various acidic or alkaline solutions can be used, e.g., aqueous hydrochloric acid, hydrobromic acid, sulfuric acid, sodium hydroxide, potassium hydroxide, calcium hydroxide, and the like.

The best mode contemplated for carrying out the invention is now set forth as follows:

EXAMPLE 1

2-Chloro-6-methylnicotinic acid

To a mixture of 75 ml. of phosphorus oxychloride, 340 g. of finely ground phosphorus pentachloride and 800 ml. of chloroform was added 123 g. of well ground powdered 1,2-dihydro-6-methyl-2-oxonicotinic acid whereupon a slightly exothermic reaction ensued. This reaction mixture was heated to boiling over a period of 1 hour and then was refluxed for 8½ hours. The reaction mixture was next concentrated in vacuo and then concentrated in vacuo at 0.5 mm. after diluting it with methylene dichloride. The resulting residual brown oil containing some solid was poured into 800 ml. of ice water and the resulting mixture stirred at room temperature for 3 hours. A brown granular precipitate was filtered off and washed with three 60 ml. portions of water. The combined aqueous filtrate and washings were extracted with two 500 ml. portions of chloroform. Said brown granular precipitate was extracted with the same chloroform and then extracted with a third 500 ml. portion of boiling chloroform. The combined chloroform extracts were washed with water, dried over anhydrous magnesium sulfate, treated with decolorizing charcoal, filtered and concentrated in vacuo to remove the solvent. The crystalline residue was recrystallized from ethyl acetate and dried in vacuo at 60°C. for 2 hours to yield a first crop of 44 g., m.p. 142°–149°C. and a second crop of 20 g., m.p. 138°–143°C. Recrystallization of these two crops plus 7 g. of product obtained by another run from 300 ml. of ethylacetate gave 41.4 g. of 2-chloro-6-methylnicotinic acid, m.p. 150°–151°C. Also obtained was a second crop of 9.3 g., m.p. 141°–147°C. Using molar equivalent quantities of phosphorus oxybromide and phosphorus pentabromide in place of phosphorus oxychloride and phosphorus pentachloride, respectively, 2-bromo-6-methylnicotinic acid is obtained.

EXAMPLE 2

2-Ethylamino-6-methylnicotinic acid

A mixture of 41.4 g. of 2-chloro-6-methylnicotinic acid and 520 ml. of 70% aqueous ethylamine was heated in a stainless steel autoclave for 20 hours at 100°C., the maximum pressure being about 200 lbs. per square inch. The reaction mixture was concentrated in vacuo. To the remaining brown oil was added 20.3 g. of sodium bicarbonate in 270 ml. of water and the mixture was concentrated in vacuo. The resulting residue was taken up in benzene and the solution concentrated in vacuo to remove the benzene; this benzene treatment was repeated twice. The residue was dissolved in hot benzene, the solution filtered, and the filtrate concentrated to yield 49 g. of crude product, 2-ethylamino-6-methylnicotinic acid, which was used in Example 3 without further purification. In another run, the crude product (from 10.89 of 2-chloro-6-methylnicotinic acid) was recrystallized once from benzene to yield the product as a tan-yellow solid (9.8 g.), m.p. 112°–115°C. A sample for analysis, m.p. 116°–118°C., was obtained by recrystallization from benzene-cyclohexane after treating the hot benzene solution with decolorizing charcoal and filtering off the charcoal.

EXAMPLE 3

1-Ethyl-7-methyl-1H,4H-pyrido[2,3-d][1,3]-oxazine-2,4-dione

To a solution containing 49 g. of 2-ethylamino-6-methylnicotinic acid dissolved in 250 ml. of xylene, was added 400 ml. of ethyl chloroformate and the mixture was refluxed for 20 hours. The reaction mixture was concentrated in vacuo, the residue taken up in benzene and the benzene removed in vacuo. The benzene treatment was repeated. The residue was crystallized from benzene-cyclohexane to yield 29 g. of crystalline product, which had a faint odor of ethyl chloroformate. The product was triturated twice with ether:cyclohexane (1:1), the mixture filtered and the product dried in vacuo for two hours to yield 28.7 g. of 1-ethyl-7-methyl-1H,4H-pyrido[2,3-d][1,3]oxazine-2,4-dione, m.p. 116°–117°C.

Alternatively, the above preparation can be carried out using phosgene in place of ethyl chloroformate.

EXAMPLE 4

1-Ethyl-1,4-dihydro-2,7-dimethyl-4-oxo-1,8-naphthyridine-3-carboxylic acid

To a cooled and stirred mixture containing 70 ml. of dry dimethylformamide and 4.4 g. of sodium hydride (60%) under an atmosphere of nitrogen was added with stirring 14 ml. of ethyl acetoacetate. After the foaming had subsided (about 30 minutes), to the stirred mixture was added 22.7 g. of 1-ethyl-7-methyl-1H,4H-pyrido[2,3-d][1,3]oxazine-2,4-dione and the resulting stirred reaction mixture was slowly warmed up to 90°C. (on a steam bath) and kept there for 6 hours. The reaction mixture was then concentrated in vacuo to yield 37 g. of brown gummy residue containing ethyl 1-ethyl-1,4-dihydro-2,7-dimethyl-4-oxo-1,8-naphthyridine-3-carboxylate. The residue was dissolved in 250 ml. of 95% ethanol; 36.8 ml. of 35% aqueous sodium hydroxide solution was added; and, the mixture was refluxed with stirring for 2 hours. The hot reaction mixture was filtered and the filtrate concentrated in vacuo. The residual solid was dissolved in 280 ml. of water, the solution filtered and the filtrate acidified with acetic acid plus some hydrochloric acid to a pH of 5. The acidic solution was cooled and the separated product was collected to yield 16.35 g. of tan-white crystals after drying in vacuo at 90°C. The crystals were recrystallized once from tetrahydrofuran-benzene and then twice from tetrahydrofuran to yield, as white crystals, 7.2 g. of 1-ethyl-1,4-dihydro-2,7-dimethyl- 4-oxo-1,8-naphthyridine-3-carboxylic acid, m.p. 226°–227°C.

EXAMPLE 5

1-Ethyl-1,4-dihydro-7-methyl-4-oxo-1,8-naphthyridine-3-carboxylic acid is prepared following the procedure described in Example 4 but using in place of ethyl acetoacetate an equivalent molar quantity of ethyl formylacetate.

EXAMPLE 6

1,2-Dihydro-2-oxo-6-(4-pyridyl)nicotinic Acid

To a solution containing 70 ml. of 97% sulfuric acid and 70 ml. of water was added 19.7 g. of 1,2-dihydro-2-oxo-6-(4-pyridyl)nicotinonitrile. The resulting solution was refluxed for 96 hours, allowed to cool and poured into 1,500 ml. of water. The solution was neutralized with 35% aqueous sodium hydroxide solution. The resulting precipitate was collected, dried, recrystallized from dimethylformamide (about 1,500 ml.), washed with ethanol and dried in vacuo at 60°C. to yield 5.45 g. of 1,2-dihydro-2-oxo-6-(4-pyridyl)nicotinic acid, m.p. >300°C. with decomposition. A small sample for analysis was recrystallized a second time from dimethylformamide.

Following the procedure described in Example 6 but using in place of 1,2-dihydro-2-oxo-6-(4-pyridyl)-nicotinonitrile a molar equivalent quantity of the appropriate 1,2-dihydro-2-oxo-6-Q′′′-nicotinonitrile, there are obtained the corresponding 1,2-dihydro-2-oxo-6-Q′′′-nicotinic acids of Examples 7–13:

EXAMPLE 7

1,2-Dihydro-2-oxo-6-(3-pyridyl)nicotinic acid using 1,2-dihydro-2-oxo-6-(3-pyridyl)nicotinonitrile, the latter prepared by reacting the sodium salt of nicotinoylacetaldehyde with cyanoacetamide.

EXAMPLE 8

1,2-Dihydro-6-(2-methyl-4-pyridyl)-2-oxonicotinic acid using 1,2-dihydro-6-(2-methyl-4-pyridyl)-2-oxonicotinonitrile, the latter prepared by reacting the sodium salt of 2-methylisonicotinoylacetaldehyde with cyanoacetamide.

EXAMPLE 9

1,2-Dihydro-6-(3-methyl-4-pyridyl)-2-oxonicotinic acid using 1,2-dihydro-6-(3-methyl-4-pyridyl)-2-oxonicotinonitrile, the latter prepared by reacting the sodium salt of 3-methylisonicotinoylacetaldehyde with cyanoacetamide.

EXAMPLE 10

6-(2-Ethyl-4-pyridyl)-1,2-dihydro-2-oxonicotinic acid using 6-(2-ethyl-4-pyridyl)-1,2-dihydro-2-oxonicotinonitrile, the latter prepared by reacting the sodium salt of 2-ethylisonicotinoylacetaldehyde with cyanoacetamide.

EXAMPLE 11

6-(3-Ethyl-4-pyridyl)-1,2-dihydro-2-oxonicotinic acid using 6-(3-ethyl-4-pyridyl)-1,2-dihydro-2-oxonicotinonitrile, the latter prepared by reacting the sodium salt of 3-ethylisonicotinoylacetaldehyde with cyanoacetamide.

EXAMPLE 12

1,2-Dihydro-6-(2,6-dimethyl-4-pyridyl)-2-oxonicotinic acid using 1,2-dihydro-6-(2,6-dimethyl-4-pyridyl)-2-oxonicotinonitrile, the latter prepared by reacting the sodium salt of 2,6-dimethylisonicotinoylacetaldehyde with cyanoacetamide.

EXAMPLE 13

1,2-Dihydro-6-(3,5-dimethyl-4-pyridyl)-2-oxonicotinic acid using 1,2-dihydro-6-(3,5-dimethyl-4-pyridyl)-2-oxonicotinonitrile, the latter prepared by reacting the sodium salt of 3,5-dimethylisonicotinoylacetaldehyde with cyanoacetamide.

Following the procedure described in Example 1 but using in place of 1,2-dihydro-6-methyl-2-oxonicotinic acid a molar equivalent quantity of the appropriate 1,2-dihydro-2-oxo-6-Q′′′-nicotinic acid, there are obtained the following 2-chloro-6-Q′′′-nicotinic acids of Examples 14–21:

EXAMPLE 14

2-Chloro-6-(3-pyridyl)nicotinic acid using 1,2-dihydro-2-oxo-6-(3-pyridyl)nicotinic acid.

EXAMPLE 15

2-Chloro-6-(2-methyl-4-pyridyl)-nicotinic acid using 1,2-dihydro-6-(2-methyl-4-pyridyl)-2-oxonicotinic acid.

EXAMPLE 16

2-Chloro-6-(3-methyl-4-pyridyl)-nicotinic acid using 1,2-dihydro-6-(3-methyl-4-pyridyl)-2-oxonicotinic acid.

EXAMPLE 17

2-Chloro-6-(2-ethyl-4-pyridyl)nicotinic acid using 6-(2-ethyl-4-pyridyl)-1,2-dihydro-2-oxonicotinic acid.

EXAMPLE 18

2-Chloro-6-(3-ethyl-4-pyridyl)nicotinic acid using 6-(3-ethyl-4-pyridyl)-1,2-dihydro-2-oxonicotinic acid.

EXAMPLE 19

2-Chloro-6-(2,6-dimethyl-4-pyridyl)-nicotinic acid using 1,2-dihydro-6-(2,6-dimethyl-4-pyridyl)-2-oxonicotinic acid.

EXAMPLE 20

2-Chloro-6-(4-pyridyl)nicotinic acid using 1,2-dihydro-2-oxo-6-(4-pyridyl)nicotinic acid.

EXAMPLE 21

2-Chloro-6-(3,5-dimethyl-4-pyridyl)-nicotinic acid using 1,2-dihydro-6-(3,5-dimethyl-4-pyridyl)-2-oxonicotinic acid.

Following the procedure described in Example 2 but using in place of 2-chloro-6-methylnicotinic acid or in place of aqueous ethylamine a molar equivalent quantity of the appropriate 2-halo-6-Q'''-nicotinic acid or aqueous lower-alkylamine, respectively, there are obtained the following 2-(lower-alkylamino)-6-Q'''-nicotinic acids of Examples 22–33:

EXAMPLE 22

2-Ethylamino-6-(3-pyridyl)nicotinic acid using 2-chloro-6-(3-pyridyl)nicotinic acid and ethylamine.

EXAMPLE 23

2-Ethylamino-6-(2-methyl-4-pyridyl)-nicotinic acid using 2-chloro-6-(2-methyl-4-pyridyl)-nicotinic acid and ethylamine.

EXAMPLE 24

2-Ethylamino-6-(3-methyl-4-pyridyl)-nicotinic acid using 2-chloro-6-(3-methyl-4-pyridyl)-nicotinic acid and ethylamine.

EXAMPLE 25

2-Ethylamino-6-(2-ethyl-4-pyridyl)-nicotinic acid using 2-chloro-6-(2-ethyl-4-pyridyl)nicotinic acid and ethylamine.

EXAMPLE 26

2-Ethylamino-6-(3-ethyl-4-pyridyl)-nicotinic acid using 2-chloro-6-(3-ethyl-4-pyridyl)nicotinic acid and ethylamine.

EXAMPLE 27

2-Ethylamino-6-(2,6-dimethyl-4-pyridyl)-nicotinic acid using 2-chloro-6-(2,6-dimethyl-4-pyridyl)-nicotinic acid and ethylamine.

EXAMPLE 28

2-Ethylamino-6-(3,5-dimethyl-4-pyridyl)-nicotinic acid using 2-chloro-6-(3,5-dimethyl-4-pyridyl)-nicotinic acid and ethylamine.

EXAMPLE 29

2-Methylamino-6-(4-pyridyl)nicotinic acid using 2-chloro-6-(4-pyridyl)nicotinic acid and methylamine.

EXAMPLE 30

2-Isopropylamino-6-(2-methyl-4-pyridyl)-nicotinic acid using 2-chloro-6-(2-methyl-4-pyridyl)-nicotinic acid and isopropylamine.

EXAMPLE 31

2-n-Butylamino-6-(4-pyridyl)-nicotinic acid using 2-chloro-6-(4-pyridyl)nicotinic acid and n-butylamine.

EXAMPLE 32

2-n-Hexylamino-6-(4-pyridyl)nicotinic acid using 2-chloro-6-(4-pyridyl)nicotinic acid and n-hexylamine.

EXAMPLE 33

2-Ethylamino-6-(4-pyridyl)nicotinic acid using 2-chloro-6-(4-pyridyl)nicotinic acid and ethylamine.

Following the procedure described in Example 3 but using in place of 2-ethylamino-6-methylnicotinic acid a molar equivalent quantity of the appropriate 2-(lower-alkylamino)-6-Q'''-nicotinic acid, there are obtained the following 1-(lower-alkyl)-7-Q'''-1H,4H-pyrido[2,3-d][1,3]oxazine-2,4-diones of Examples 34–45:

EXAMPLE 34

1-Ethyl-7-(3-pyridyl)-1H,4H-pyrido[2,3-d][1,3]oxazine-2,4-dione using 2-ethylamino-6-(3-pyridyl)nicotinic acid.

EXAMPLE 35

1-Ethyl-7-(2-methyl-4-pyridyl)-1H,4H-pyrido[2,3-d][1,3]oxazine-2,4-dione using 2-ethylamino-6-(2-methyl-4-pyridyl)nicotinic acid.

EXAMPLE 36

1-Ethyl-7-(3-methyl-4-pyridyl)-1H,4H-pyrido[2,3-d][1,3]oxazine-2,4-dione using 2-ethylamino-6-(3-methyl-4-pyridyl)nicotinic acid.

EXAMPLE 37

1-Ethyl-7-(2-ethyl-4-pyridyl)-1H,4H-pyrido[2,3-d][1,3]oxazine-2,4-dione using 2-ethylamino-6-(2-ethyl-4-pyridyl)nicotinic acid.

EXAMPLE 38

1-Ethyl-7-(3-ethyl-4-pyridyl)-1H,4H-pyrido[2,3-d][1,3]oxazine-2,4-dione using 2-ethylamino-6-(3-ethyl-4-pyridyl)nicotinic acid.

EXAMPLE 39

1-Ethyl-7-(2,6-dimethyl-4-pyridyl)-1H,4H-pyrido[2,3-d][1,3]oxazine-2,4-dione using 2-ethylamino-6-(2,6-dimethyl-4-pyridyl)nicotinic acid.

EXAMPLE 40

1-Ethyl-7-(3,5-dimethyl-4-pyridyl)-1H,4H-pyrido[2,3-d][1,3]oxazine-2,4-dione using 2-ethylamino-6-(3,6-dimethyl-4-pyridyl)nicotinic acid.

EXAMPLE 41

1-Methyl-7-(4-pyridyl)-1H,4H-pyrido-[2,3-d][1,3]oxazine-2,4-dione using 2-methylamino-6-(4-pyridyl)nicotinic acid.

EXAMPLE 42

1-Isopropyl-7-(2-methyl-4-pyridyl)-1H,4H-pyrido[2,3-d][1,3]oxazine-2,4-dione using 2-isopropyl-amino-6-(2-methyl-4-pyridyl)nicotinic acid.

EXAMPLE 43

1-n-Butyl-7-(4-pyridyl)-1H,4H-pyrido[2,3-d][1,3]oxazine-2,4-dione using 2-n-butylamino-6-(4-pyridyl)nicotinic acid.

EXAMPLE 44

1-n-Hexyl-7-(4-pyridyl)-1H,4H-pyrido[2,3-d][1,3]oxazine-2,4-dione using 2-n-hexylamino-7-(4-pyridyl)nicotinic acid.

EXAMPLE 45

1-Ethyl-7-(4-pyridyl)-1H,4H-pyrido[2,3-d][1,3]oxazine-2,4-dione using 2-ethylamino-6-(4-pyridyl)nicotinic acid.

Following the procedure described in Example 4 but using in place of 1-ethyl-7-methyl-1H,4H-pyrido[2,3-d]-[1,3]oxazine-2,4-dione a molar equivalent quanty of the appropriate 1-(lower-alkyl)-7-Q'''-1H,4H-pyrido[2,3-d][1,3]-oxazine-2,4-dione and either ethyl acetoacetate or an molar equivalent quantity of ethyl formylacetate, there are obtained the 1-(lower-alkyl)-1,4-dihydro-2-methyl(or 2-unsubstituted)-4-oxo-7-Q'''-1,8-naphthyridine-3-carboxylic acids of Examples 46–57:

EXAMPLE 46

1-Ethyl-1,4-dihydro-4-oxo-7-(3-pyridyl)-1,8-naphthyridine-3-carboxylic acid using 1-ethyl-7-(3-pyridyl)-1H,4H-pyrido[2,3-d][1,3]oxazine-2,4-dione and ethyl formylacetate.

EXAMPLE 47

1-Ethyl-1,4-dihydro-7-(2-methyl-4-pyridyl)-4-oxo-1,8-naphthyridine-3-carboxylic acid using 1-ethyl-7-(2-methyl-4-pyridyl)-1H,4H-pyrido[2,3-d][1,3]-oxazine-2,4-dione and ethyl formylacetate.

EXAMPLE 48

1-Ethyl-1,4-dihydro-2-methyl-7-(3-methyl-4-pyridyl)-4-oxo-1,8-naphthyridine-3-carboxylic acid using 1-ethyl-7-(3-methyl-4-pyridyl)-1H,4H-pyrido-[2,3-d][1,3]oxazine-2,4-dione and ethyl acetoacetate.

EXAMPLE 49

1-Ethyl-7-(2-ethyl-4-pyridyl)-1,4-dihydro-4-oxo-1,8-naphthyridine-3-carboxylic acid using 1-Ethyl-7-(2-ethyl-4-pyridyl)-1H,4H-pyrido[2,3-d][1,3]oxazine-2,4-dione and ethyl formylacetate.

EXAMPLE 50

1-Ethyl-7-(3-ethyl-4-pyridyl)-1,4-dihydro-2-methyl-4-oxo-1,8-naphthyridine-3-carboxylic acid using 1-ethyl-7-(3-ethyl-4-pyridyl)-1H,4H-pyrido[2,3-d][1,3]oxazine-2,4-dione and ethyl acetoacetate.

EXAMPLE 51

1-Ethyl-1,4-dihydro-7-(2,6-dimethyl-4-pyridyl)-4-oxo-1,8-naphthyridine-3-carboxylic acid using 1-ethyl-7-(2,6-dimethyl-4-pyridyl)-1H,4H-pyrido[2,3-d][1,3]-oxazine-2,4-dione and ethyl formylacetate.

EXAMPLE 52

1-Ethyl-1,4-dihydro-2-methyl-7-(3,5-dimethyl-4-pyridyl)-4-oxo-1,8-naphthyridine-3-carboxylic acid using 1-ethyl-7-(3,5-dimethyl-4-pyridyl)-1H,4H-pyrido-[2,3-d][1,3]oxazine-2,4-dione and ethyl acetoacetate.

EXAMPLE 53

1,4-Dihydro-1-methyl-4-oxo-7-(4-pyridyl)-1,8-naphthyridine-3-carboxylic acid using 1-methyl-7-(4-pyridyl)-1H,4H-pyrido[2,3-d][1,3]oxazine-2,4-dione and ethyl formylacetate.

EXAMPLE 54

1,4-Dihydro-1-isopropyl-7-(2-methyl-4-pyridyl)-4-oxo-1,8-naphthyridine-3-carboxylic acid using 1-isopropyl-7-(2-methyl-4-pyridyl)-1H,4H-pyrido[2,3-d][1,3]-oxazine-2,4-dione and ethyl formylacetate.

EXAMPLE 55

1-n-Butyl-1,4-dihydro-2-methyl-4-oxo-7-(4-pyridyl)-1,8-naphthyridine-3-carboxylic acid using 1-n-butyl-7-(4-pyridyl)-1H,4H-pyrido[2,3-d][1,3]oxazine-2,4-dione and ethyl acetoacetate.

EXAMPLE 56

1-n-Hexyl-1,4-dihydro-2-methyl-4-oxo-7-(4-pyridyl)-1,8-naphthyridine-3-carboxylic acid using 1-n-hexyl-7-(4-pyridyl)-1H,4H-pyrido[2,3-d][1,3]oxazine-2,4-dione and ethyl acetoacetate.

EXAMPLE 57

1-Ethyl-1,4-dihydro-4-oxo-7-(4-pyridyl)-1,8-naphthyridine-3-carboxylic acid using 1-ethyl-7-(4-pyridyl)-1H,4H-pyrido[2,3-d][1,3]oxazine-2,4-dione and ethyl formylacetate.

We claim:

1. The process which comprises refluxing 1,2-dihydro-2-oxo-6-Q'''-nicotinonitrile in an aqueous acidic medium to produce 1,2-dihydro-2-oxo-6-Q'''-nicotinic acid, heating said 2-oxo-nicotinic acid with a halogenating agent at about 50°–110°C. to produce 2-halo-6-Q'''-nicotinic acid and heating said 2-halo compound with $R_1NH_2$ at about 75°–150°C. to produce 2-$R_1$NH-6-Q'''-nicotinic acid where $R_1$ is lower-alkyl and Q''' is 4(or 3)-pyridyl or 4(or 3)-pyridyl having 1 or 2 lower-alkyl substituents.

* * * * *

UNITED STATES PATENT OFFICE
CERTIFICATE OF CORRECTION

PATENT NO. : 3,928,366
DATED : December 23, 1975
INVENTOR(S) : Ruth Pauline Brundage and George Y. Lesher It is certified that error appears in the above-identified patent and that said Letters Patent are hereby corrected as shown below:

Column 2, line 66, "6-Q"$\lambda$" should read -- 6-Q'''- --; line 67, omit "'-".

Signed and Sealed this fourth Day of May 1976

[SEAL]

Attest:

RUTH C. MASON
Attesting Officer

C. MARSHALL DANN
Commissioner of Patents and Trademarks